(12) United States Patent
Rice et al.

(10) Patent No.: US 12,182,313 B2
(45) Date of Patent: Dec. 31, 2024

(54) SPONSORED ACCESS TO MULTI-ITEM DOCUMENT BUNDLES

(71) Applicant: Microsoft Technology Licensing, LLC, Redmond, WA (US)

(72) Inventors: Stephen Lincoln Rice, Redmond, WA (US); Sean Lamont Grant Livingston, Bothell, WA (US); Shiguang Dong, Sammamish, WA (US); Zhenguang Chen, Sammamish, WA (US); Vladimir Fesich, Renton, WA (US); Vijay Sharma, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 17/939,687

(22) Filed: Sep. 7, 2022

(65) Prior Publication Data
US 2024/0078340 A1 Mar. 7, 2024

(51) Int. Cl.
*G06F 21/62* (2013.01)

(52) U.S. Cl.
CPC ...... *G06F 21/6272* (2013.01); *G06F 21/6218* (2013.01); *G06F 2221/2141* (2013.01); *G06F 2221/2145* (2013.01)

(58) Field of Classification Search
CPC ............. G06F 21/6272; G06F 21/6218; G06F 2221/2141; G06F 2221/2145
See application file for complete search history.

(56) References Cited

U.S. PATENT DOCUMENTS

| | | | | |
|---|---|---|---|---|
| 7,127,674 B1 * | 10/2006 | Carroll | .................. | G06F 40/103 715/209 |
| 8,060,751 B2 | 11/2011 | Kitaj et al. | | |
| 8,464,161 B2 | 6/2013 | Giles et al. | | |
| 8,689,131 B2 * | 4/2014 | Ali | .......................... | G06Q 10/06 715/781 |
| 8,701,204 B2 * | 4/2014 | Carr | .................... | G06F 21/6218 726/26 |

(Continued)

OTHER PUBLICATIONS

Tolone, et al., "Access Control in Collaborative Systems", In Journal of ACM Computing Surveys, vol. 37, Issue 1, Mar. 1, 2005, pp. 29-41.

(Continued)

*Primary Examiner* — Linglan Edwards
(74) *Attorney, Agent, or Firm* — NovoTechIP International PLLC

(57) ABSTRACT

A data processing system implements detecting that a first user device associated with a first user has added a first sponsored content item to a host electronic document by adding a first reference to the first sponsored content item to the host electronic document. The first sponsored content item is stored separately in a memory of a cloud-based service from the host electronic document. The data processing system further implements determining that the first user has permission to share the first sponsored content item with other users of the cloud-based service, generating sponsor information to associate the sponsored content item with the host electronic document to permit users having access to the host electronic document to access the sponsored content item, and storing the sponsor information in a sponsored access datastore.

17 Claims, 12 Drawing Sheets

(56) References Cited

U.S. PATENT DOCUMENTS

| | | | |
|---|---|---|---|
| 9,300,652 B2* | 3/2016 | Sanso | H04L 63/0807 |
| 9,514,318 B2 | 12/2016 | Dawson et al. | |
| 10,230,731 B2 | 3/2019 | Weaver et al. | |
| 10,498,737 B2 | 12/2019 | Lewis et al. | |
| 10,635,828 B2* | 4/2020 | Lin | H04L 63/108 |
| 10,769,288 B2 | 9/2020 | Garcia et al. | |
| 11,729,228 B2* | 8/2023 | Jamison | H04L 65/403 |
| | | | 715/753 |
| 2015/0100503 A1 | 4/2015 | Lobo et al. | |
| 2017/0177688 A1* | 6/2017 | Busch | G06F 16/23 |
| 2018/0062852 A1 | 3/2018 | Schmahmann | |
| 2018/0089451 A1* | 3/2018 | Lin | H04L 63/108 |
| 2019/0121995 A1* | 4/2019 | Niu | H04L 67/1095 |
| 2020/0396222 A1 | 12/2020 | Gargaro et al. | |
| 2021/0067341 A1* | 3/2021 | Haque | H04L 9/14 |

OTHER PUBLICATIONS

International Search Report and Written Opinion received for PCT Application No. PCTUS/2023/030749, mailed on Dec. 6, 2023, 14 Pages.

\* cited by examiner

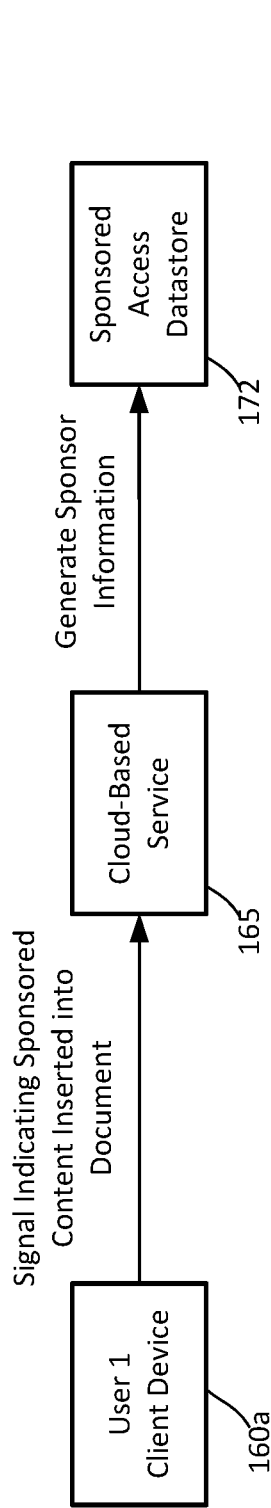
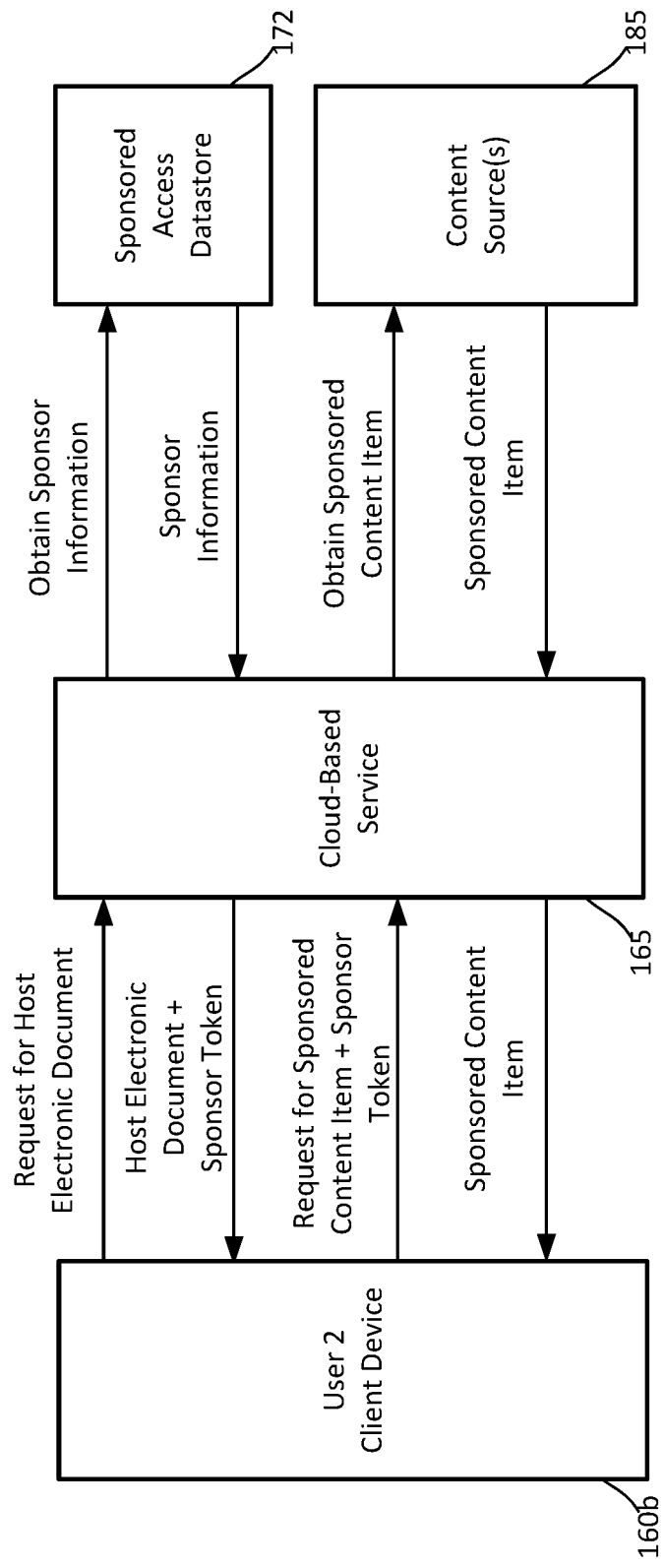

SPONSORED ACCESS TO MULTI-ITEM DOCUMENT BUNDLES

BACKGROUND

Collaboration platforms provide tools that enable multiple users to collaborate with one another in a cohesive manner to create, prepare, review, and/or format various types of electronic documents. These electronic documents may include but are not limited to word processing documents, spreadsheets, presentations, images, drawings, videos, web pages, and/or documents or components generated by other types of software applications. Many collaboration platforms enable users to reference electronic content items in a host electronic document to provide an even richer user experience. The referenced content items are presented to users who access the host electronic document. The referenced electronic content items may include but are not limited to word processing documents, spreadsheets, presentations, images, drawings, videos, web pages, and/or documents or components generated by other types of software applications. Consequently, a host electronic document may include references to other electronic content items, and each of the referenced electronic content items may be associated with different data protection and privacy requirements. Often, these data protection and privacy requirements are implemented through access control lists (ACLs) which determine who may access the electronic documents and the types of actions that these users may perform on these electronic documents. However, managing ACLs for referenced content items in a collaborative environment is impractical and would require significant manual effort to keep the ACLs up to date, as access permissions to the host document are updated to include or remove users and/or additional referenced content items are added to the host electronic document. Hence, there is a need for improved systems and methods for controlling access to such electronic documents that include referenced electronic content items.

SUMMARY

An example data processing system according to the disclosure may include a processor and a machine-readable medium storing executable instructions. The instructions when executed cause the processor to perform operations including detecting that a first user device associated with a first user has added a first sponsored content item to a host electronic document by adding a first reference to the first sponsored content item to the host electronic document, the first sponsored content item being stored separately from the host electronic document in a memory of a cloud-based service; determining that the first user has permission to share the first sponsored content item with other users of the cloud-based service; generating sponsor information to associate the sponsored content item with the host electronic document to permit users having access to the host electronic document to access the sponsored content item; and storing the sponsor information in a sponsored access datastore.

An example method implemented in a data processing system for sponsoring access to sponsored electronic content includes detecting that a first user device associated with a first user has added a first sponsored content item to a host electronic document by adding a first reference to the first sponsored content item to the host electronic document, the first sponsored content item being stored separately from the host electronic document in a memory of a cloud-based service; determining that the first user has permission to share the first sponsored content item with other users of the cloud-based service; generating sponsor information to associate the sponsored content item with the host electronic document to permit users having access to the host electronic document to access the sponsored content item; and storing the sponsor information in a sponsored access datastore.

An example machine-readable medium on which are stored instructions. The instructions when executed cause a processor of a programmable device to perform operations of detecting that a first user device associated with a first user has added a first sponsored content item to a host electronic document by adding a first reference to the first sponsored content item to the host electronic document, the first sponsored content item being stored separately from the host electronic document in a memory of a cloud-based service; determining that the first user has permission to share the first sponsored content item with other users of the cloud-based service; generating sponsor information to associate the sponsored content item with the host electronic document to permit users having access to the host electronic document to access the sponsored content item; and storing the sponsor information in a sponsored access datastore.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1C is a diagram showing how sponsor information is generated according to the techniques disclosed herein.

FIG. 1D is a diagram showing how a sponsor token is generated from the sponsor information according to the techniques disclosed herein.

DETAILED DESCRIPTION

Figure 1A:
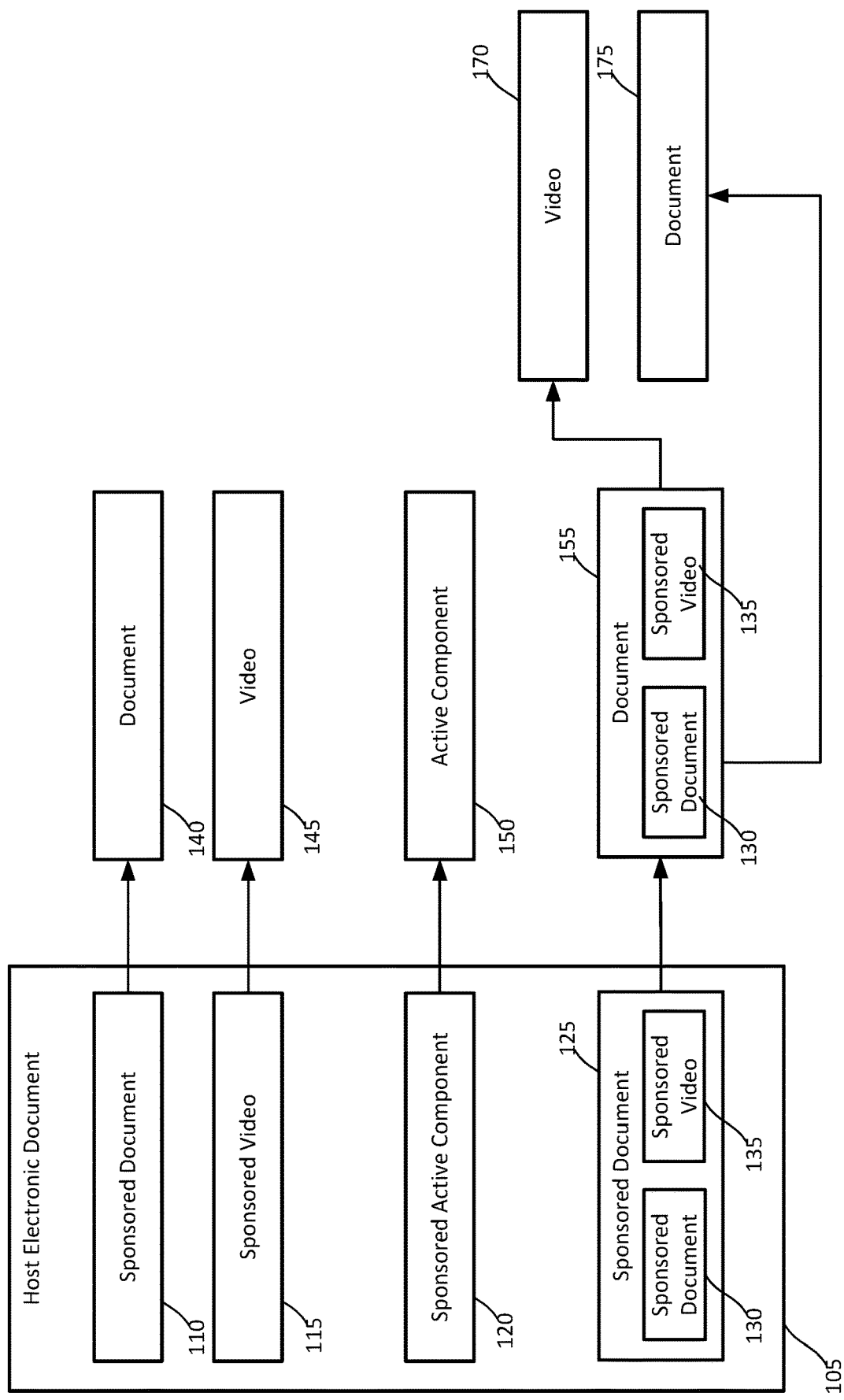
FIGS. 1A and 1B are diagrams showing an example electronic document that includes sponsored content items according to the techniques disclosed herein.

Techniques for sponsoring access to sponsored content in host electronic documents are provided. The techniques provided offer a technical solution for managing and implementing access to sponsored content in a host electronic document. These techniques provide for host sponsorship in which a user who is granted access to the host electronic document that includes sponsored electronic content is also granted similar access to the sponsored content items that are sponsored in the host electronic document. The host sponsorship is recursive and applies to sponsored content items which themselves include sponsored content items. This approach provides technical benefits over the current approaches for managing the access to such sponsored content items, including improving the user experience and improving the data protection and data privacy. The user experience of a user sharing a host electronic document is significantly improved as well as the user experience of users with whom the host electronic document has been shared. The user sharing the host electronic document does not need to manually keep a complex set of permissions of both the host electronic document and the sponsored electronic content items synchronized, which is labor-intensive and error prone. Instead, the user sharing the electronic document can modify the access control list or other permissions associated with the sponsored content items to permit access based on a sponsorship claim that asserts that the holder of the claim has access to a specific host electronic document. This approach provides access to the sponsored content items to users who can prove that they have access to the host electronic document. A technical benefit of this approach is that the user sharing the document does not need to modify the access control list or other permissions associated with each of the sponsored content items whenever another user is to be permitted access to the host electronic document and the sponsored content items. Only user who can prove that they have access to the host electronic document through the sponsorship claim are permitted to access the sponsored content items unless those users otherwise have access to the sponsored content items.

The user experience of the users with whom the host electronic document is shared is also improved, because these users are more likely to be able to access the sponsored content items and experience the rich user experience intended by the authors of the host electronic document. The techniques provided herein also improve the data privacy and data security associated with the sponsored content items. The techniques provided herein provide an additive approach to existing permissions associated with the sponsored content items. Thus, any access limits or controls on the sponsored content items are not overridden by the host sponsorship techniques provided herein. Furthermore, access to the sponsored content items can be easily revoked at any time by updating the access control list or other permissions associated with the sponsored content items to remove access to the sponsored content items through the sponsorship claim. Access to all the sponsored content items associated with a given host electronic document may be invalidated. The sponsorship would need to be reestablished for any content items for which access was removed. These and other technical benefits of the techniques disclosed herein will be evident from the discussion of the example implementations that follow.

Figure 1B:
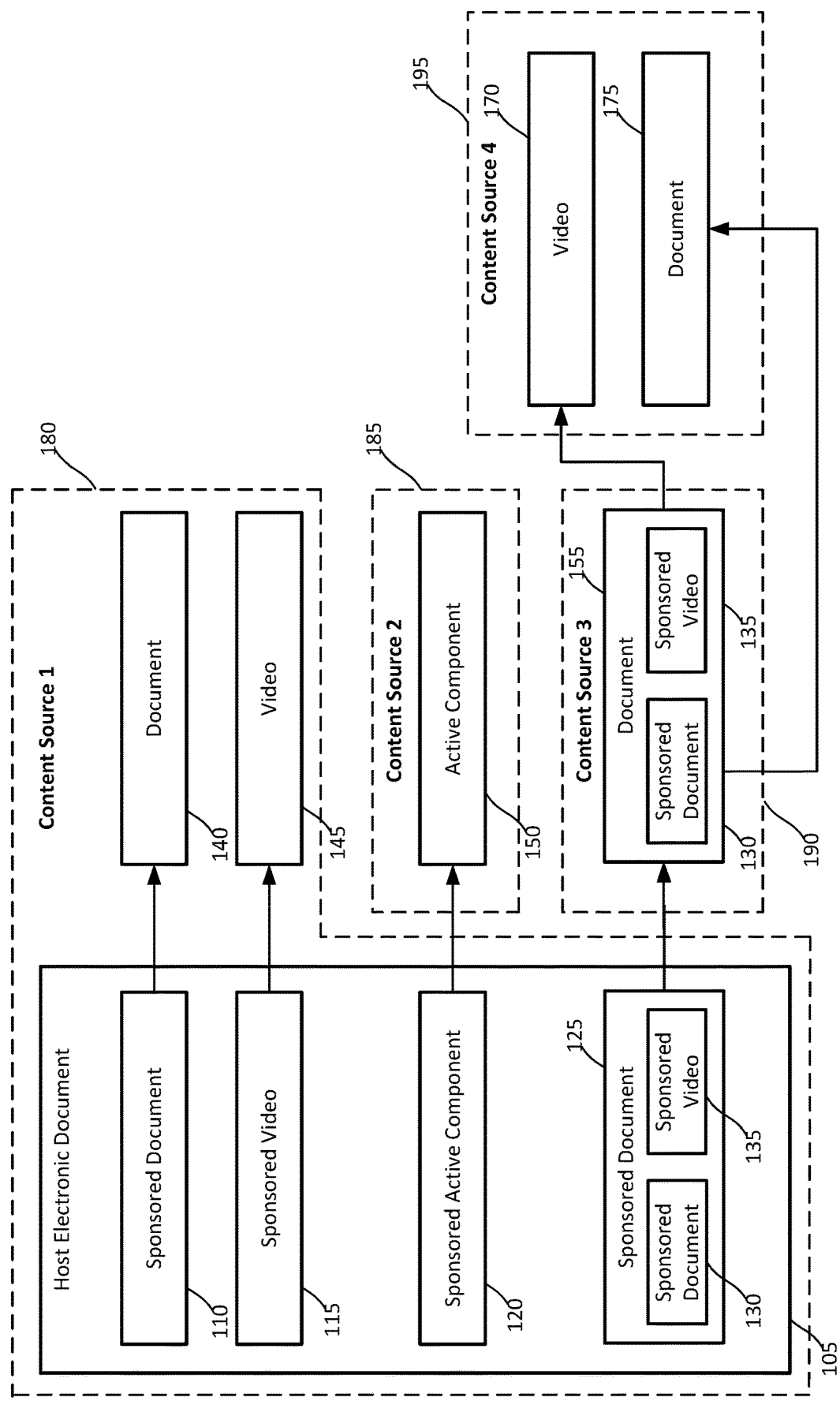

FIGS. 1A and 1B show an example host electronic document 105 that includes sponsored electronic content items. The host electronic document 105 may be a word processing document, spreadsheet, presentation slide, web page, or other type of electronic document. The host electronic document 105 includes sponsored electronic content items that have been added by an author of the host electronic document 105. The sponsored electronic content items may include but are not limited to word processing documents, spreadsheets, presentations, images, drawings, videos, web pages, and/or documents or components generated by other types of software applications. In the example shown in FIGS. 1A and 1B, the host electronic document 105 includes a sponsored document 110, a sponsored video 115, a sponsored active component 120, and a sponsored document 125. The sponsored document 125 is also a host document to the sponsored document 130 and the sponsored video 135. While the example shown in FIGS. 1A and 1B includes two levels of sponsorship, other instances of electronic documents may include just a single level of sponsorship or may include more than the two levels of sponsorship shown in FIGS. 1A and 1B.

The sponsored document 110 does not include the document contents. Instead, the sponsored document 110 is a link or a reference to a content source from which the document 140 may be obtained. In some implementations, the link is a Universal Resource Locator (URL) or Uniform Resource Identifier (URI). In other implementations, the sponsored document 110 is a reference to a memory location, database or datastore entry, or other storage location from which the sponsored document 110 may be accessed.

The sponsored video 115 is a link or reference to the video 145. The sponsored active component 120 is a link or reference to the active component 150. The active component 150 is a portable component for performing various actions inline in an electronic document, such as but not limited to data visualization and collaboration. Multiple instances of the active component 150 may be accessed simultaneously by a set of users and the data is synchronized among the instances of the active component 150. In some implementations, the active component 150 is a Microsoft Loop component. The sponsored document 125 is a reference to the document 155. The sponsored document 125 includes sponsored document 130 and sponsored video 135. The sponsored document 125 is a link or reference to the document 175. The sponsored video 135 is a link or reference to the video 170.

FIG. 1B shows that the host electronic document 105 and the various sponsored content items may be obtained from various content sources. In the example shown in FIG. 1B, the host electronic document 105, the document 140, and the video 145 are stored by the first content source 180. The active component 150 is stored by a second content source 185. The document 155 is stored by a third content source 190, and the video 170 and the document 175 are stored by a fourth content source 195. Each content source may be a separate persistent datastore associated with a cloud-based service. Each content source may be associated with different entities and may have a different set of access permissions associated with the content stored therein that limits who may access the content and which actions may be taken with the content.

As will be discussed in greater detail in the examples which follow, sponsored access is provided to enable users who have access to the host electronic document 105 to access the sponsored content items sponsored in the host electronic document 105. Without such sponsorship, a user who is provided access to the host electronic document 105 may not have access to one or more of the sponsored content items. This can negatively impact the user experience. For example, an author of the host electronic document 105 would need to manually adjust the access controls list or other means for controlling access to the content to permit each user to access each sponsored content item. However, this approach is extremely impractical. A host electronic document, such as the host electronic document 105, may include multiple sponsored content items for which the access permissions would need to be updated. Furthermore, the users who have access to the host electronic document 105 may change over time, with additional users being provided access, while other users have their access to the host electronic document revoked. Each of these changes would require further adjustments to the access control list or other means for controlling access to the sponsored content items. To further complicate matters, the host electronic document 105 may be a collaborative document. Multiple authors may be contributing to the content of the host electronic document 105, including adding sponsored content items to the host electronic document 105. Each of these authors would need to ensure that the sponsored content items that they add to the host electronic document 105 are accessible to other authors and other users who have at least read access to the host electronic document 105. Sponsored access, as provided herein, addresses these technical problems to provide a secure and efficient means for providing access to the sponsored content included in a host electronic document.

The techniques described herein provide sponsor tokens that permit users who have access to the host electronic document to access the sponsored electronic content included in the electronic document. A user granted access to the host electronic document 105 may be provided a sponsor token that permits access to the sponsored content items included therein. The sponsor token may be presented by the client device of a user who is accessing host electronic document 105 to permit the user to access the sponsored content included therein. As discussed above, the access control list or other permissions associated with a sponsored content item is updated to permit access to the sponsored content item based on a sponsorship claim. However, the permissions associated with the sponsorship claim are additive and do not override access controls on the sponsored content item.

A sponsored content item may be associated with access controls, such as but not limited to an access control list, which may preclude a user from accessing that sponsored content item. The sponsor token does not override such access controls. A user who possesses the sponsor token for a host electronic document in which such a sponsored content item is sponsored would still be unable to access that sponsored content item. However, the user would still be able to access other sponsored content items sponsored in that host document if the access controls for those sponsored documents do not preclude the user from accessing those sponsored items. In a non-limiting example to illustrate how sponsored access may be utilized, a host electronic document includes sponsored content items from a first content source and a second content source of an enterprise. The first content source is associated with a first group of users of the enterprise located in a first country, and the second content source is associated with a second group of users of the enterprise located in a second country. While both the first and second groups are part of the same enterprise, data privacy and protection rules place limits on the types of data that may be exported from the second country. Consequently, a user associated with the first group located in the first country may be precluded from accessing sponsored content items from the second content source in the second country even if the user is provided a sponsor token for the host electronic document. The sponsor token does not override the data privacy and protection rules implemented in an access control list or other such means associated with the content items stored in the second content source. However, the users associated with the second group in the second country can access the sponsored content items associated with the first content source using a sponsor token for the host electronic document, because the first country does not impose the same data privacy and protection rules as the second country, or the data contained in the first content source is not subject to such restrictions. Other implementations may include other restrictions on which users may access data and/or the types of actions that the users may perform on this data. For example, access control lists or other access control means may impose restrictions on which user or groups of users within an organization may access certain content, restrictions on performing certain actions on content, such as cutting and pasting or printing the content, or restrictions on sharing the content via email, messaging, or via other means.

FIG. 1C is a diagram showing an example of a sponsored link being generated in response to a first user taking an action that indicates sponsored content is being inserted into a host electronic document. In this example, the first user is editing a host electronic document in a web-based application accessed from a browser application on the client device 160*a* of the first user. The client device 160*a* of first user sends a signal to the cloud-based service 165 indicating that sponsored content is being inserted into a host electronic content. The cloud-based service 165 provides one or more applications for creating, consuming, and/or modifying content, file storage and management platforms, collaboration and communications platforms, and other types of software as a service. The signal may be generated by the client device 160*a* in response to a paste command or insert command indicating that the user is adding a sponsored content item to the host electronic document. The contents of the electronic content item are not directly added to the contents of the host electronic document. Instead, a link or reference to the electronic content item is stored in the host electronic document, and the sponsored electronic content item is rendered when the host electronic document is accessed by a user to view and/or modify the host electronic content item. As discussed with respect to FIG. 1B, the host electronic document and the sponsored content item may be stored in the same content source or may be stored in separate content sources. The cloud-based service 165 generates sponsor information that indicates that a user who has access to the host electronic document 105 and the sponsor information is also permitted to access the sponsored content items included in the host electronic document 105. The sponsor information associates the host electronic document 105 with the sponsored content items so that the cloud-based service can generate a sponsor token for users who are authorized to access the host electronic document 105. The cloud-based service 165 also generates a sponsor information for each sponsored content item that includes sponsored content items as well. In the example shown in FIGS. 1A and 1B, the cloud-based service 165 would generate a sponsor information for the host electronic document 105 to access the sponsored content items 110, 115, 120, and 125. The cloud-based service 165 would also generate sponsor information for the document 155 to permit a user who has access to the document 155 to access the video 170 and the document 175 sponsored in the document 155. In other implementations, the sponsor information may indicate: (1) how many sponsored content items are sponsored in the host electronic document, and/or (2) how may sponsored content items are also host electronic documents which also include sponsored content items. The cloud-based service 165 stores the sponsored link information in the sponsored access datastore 172. Furthermore, the access control list or other permissions associated with each of the sponsored content items are also updated to permit access to the sponsored content items based on the sponsorship claim in some implementations, and the sponsorship claim is then included in the sponsor token to permit access to the sponsored content items.

FIG. 1D is a diagram showing an example of the sponsored link generated in FIG. 1C being used to generate a sponsored token that permits a second user to access the sponsored electronic content sponsored in the host electronic document 105. The second user accesses the host electronic document 105 from the client device 160b. In some implementations, the first user who created the host electronic document 105 shares a link to the host electronic document 105, which when activated, causes the client device 160b to request the host electronic document 105 from the cloud-based service 165. The client device 160b may present the host electronic document 105 in a native application or a browser application on the client device 160b. In response to the request from the client device 165, the cloud-based service 165 may obtain the sponsor information (if any) for the requested document from the sponsored access datastore 172.

The cloud-based service 165 receives the sponsor information and generates a sponsor token from the sponsor information. In some implementations, the sponsor token includes a single sponsorship claim that indicates that the bearer of the token is permitted to access the sponsored content items associated with the host electronic document. The cloud-based service 165 also signs the token using a private key associated with the cloud-based service 165. Signing the token verifies that it has been generated by the cloud-based service 165. Signing the token also verifies the integrity of the token, indicating that the claim contained therein has not been altered. An expiration date and/or time is set for the sponsor token at the time that the token is signed in some implementations. In some implementations, the token may be set to expire after a predetermined period of time, such as but not limited to a predetermined number of minutes, seconds, or other increment of time. If the token has expired, a new token may be requested, and the sponsor token is regenerated with a new expiration window. This allows a token refresh mechanism to be implemented that determines whether the sponsor token needs to be refreshed or will soon need to be refreshed. Furthermore, the contents of the token can be encrypted to ensure that the contents cannot be read or intercepted by a third party.

The cloud-based service 165 provides the host electronic document and the sponsor token to the client device 160b, and the client device 160b renders the host electronic document in the browser application or native application. The browser application or native application detects the links to the sponsored content item or items in the host electronic document 105 and requests the sponsored content item or items from the cloud-based service 165. The sponsor token is provided to the cloud-based service 165 with the request for the sponsored content item. The cloud-based service 165 determines whether the user is precluded from accessing the sponsored content item based on the access control list or other access control means associated with the sponsored content items. As discussed in the preceding examples, the permissions provided by the sponsorship claim are additive and will not contradict any protections that would preclude a particular user from obtaining access to the sponsored content item. Such restrictions may include but are not limited to data privacy and protection restrictions, geographical restrictions, restrictions on which user or groups of users within an organization may access certain content, restrictions on performing certain actions on content, such as cutting and pasting or printing the content, or restrictions on sharing the content via email, messaging, or via other means. If the user is not precluded from accessing the sponsored content item, the cloud-based service 165 retrieves the sponsored content item from the content source in which the sponsored content item is stored. In the non-limiting example shown in FIG. 1D, the sponsored content item is stored in the content source 185. The cloud-based service 165 then provides the sponsored content item to the client device 160b, and the client device 160b renders the sponsored content item so that the sponsored content item appears to be part of the host electronic document 105. This process will be repeated for host electronic documents that include multiple sponsored content items. Furthermore, if there is a sponsored content item that is also a host electronic document, the cloud-based service 165 will obtain the sponsor information for that sponsored content item, and the client device 160b requests that sponsored content item(s) sponsored in the sponsored content item that was also a host sponsored document. This process may be repeated for multiple layers of sponsorship.

Additional details of how a sponsor token may be generated for a host electronic document and used to access the host electronic document and the sponsored content items therein are described in detail in the example implementation which follow.

Figure 2:
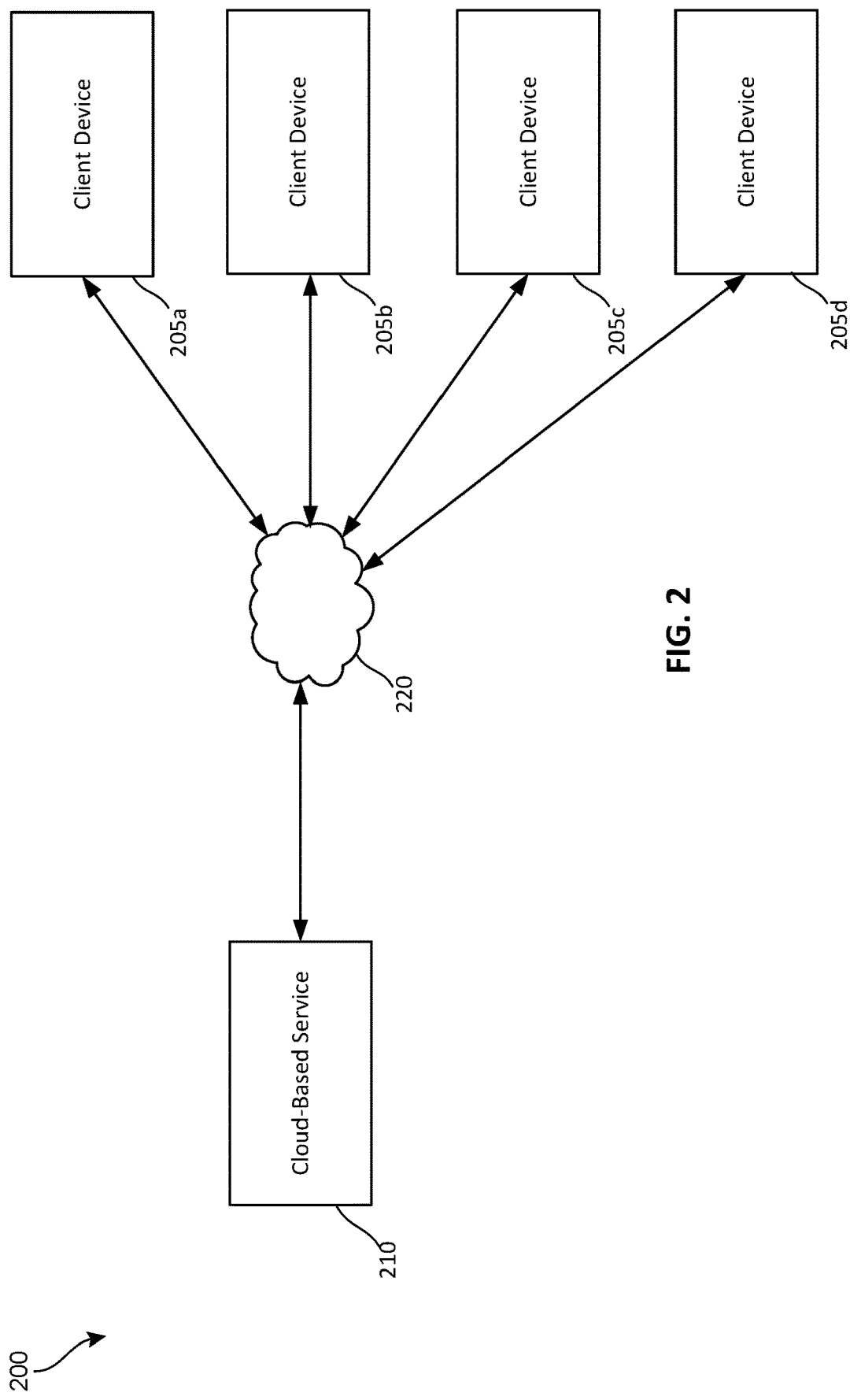
FIG. 2 is a diagram showing an example computing environment in which the cloud-based service shown in FIG. 1 may be implemented.

FIG. 2 is a diagram showing an example computing environment 200 in the sponsored access techniques herein may be implemented. The computing environment 200 includes the cloud-based service 210 that implements the techniques for providing sponsored access to described herein. The example computing environment 200 includes one or more client devices, such as the client devices 205a, 205b, 205c, and 205d (collectively referred to as client device 205). The cloud-based service 210 can implement the cloud-based service 165 shown in FIGS. 1C and 1D, and the client devices 205a, 205b, 205c, or 205d can implement the client devices 160a and 160b shown in FIGS. 1C and 1D.

The client devices 205a, 205b, 205c, and 205d communicate with the cloud-based service 210 via the network 220 to utilize the services provided by the cloud-based service 210. The client devices may be used by administrators of the cloud-based service 210 to configure and monitor the performance of the cloud-based service 210 and/or by customers of the cloud-based service 210 to access the services provided by the cloud-based services 210. The network 220 may be a dedicated private network and/or the combination of public and private networks commonly referred to as the Internet.

In the example shown in FIG. 2, the cloud-based service 210 is implemented as a cloud-based service or set of services. These services may include, but are not limited to, applications for creating, consuming, and/or modifying content, file storage and management platforms, collaboration and communications platforms, and other types of software as a service. The cloud-based service 210 enables the user to create host electronic documents, such as the host electronic document 105, that includes sponsored content items. The cloud-based service 210 also creates sponsor tokens for the host electronic documents that provide access to authorized users in possession of the sponsor tokens. Additional details of the creation and usage of the sponsor tokens are provided in the examples which follow.

The cloud-based service 210 may include numerous servers, network devices, storage elements and other components to support the various services that are provided by the cloud-based service 210. For example, the cloud-based service 210 may include one or more collections of computer servers, referred to as a server farm, that are configured to provide computational and/or storage resources for at least a portion of the services provided by the cloud-based service 210. The server farm may be configured to provide fail-over protection so that if a computer server within the server farm experiences a failure, the tasks assigned to that server are handed off to another computer server within the farm. The server farm may also be configured to such that one or more machines may be taken offline temporarily to facilitate updates to the software and/or configuration data of the servers. Other architectures are also possible, and the deployment configuration information for deploying an update to the cloud-based service 210 accounts for the specific architecture and configuration of the components thereof. Furthermore, the cloud-based service 210 may also include other hardware and software to support various processes and services that support and maintain the components of the cloud-based service 210.

The client devices 205a, 205b, 205c, and 205d are computing devices that may be implemented as a portable electronic device, such as a mobile phone, a tablet computer, a laptop computer, a portable digital assistant device, a portable game console, and/or other such devices. The client device 205 may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices that utilize the cloud-based service 210. Furthermore, in some implementations, some features of the services provided by the cloud-based service 210 are implemented by a native application installed on the client device 205, and the native application communicates with the cloud-based service 210 over a network connection to exchange data with the cloud-based service 210 and/or to access features implemented on the cloud-based service 210. As discussed above, the client devices may be used by administrators of the cloud-based service 210 to configure and monitor the performance of the cloud-based service 210 and/or by customers of the cloud-based service 210 to access the services provided by the cloud-based services 210.

Figure 3:
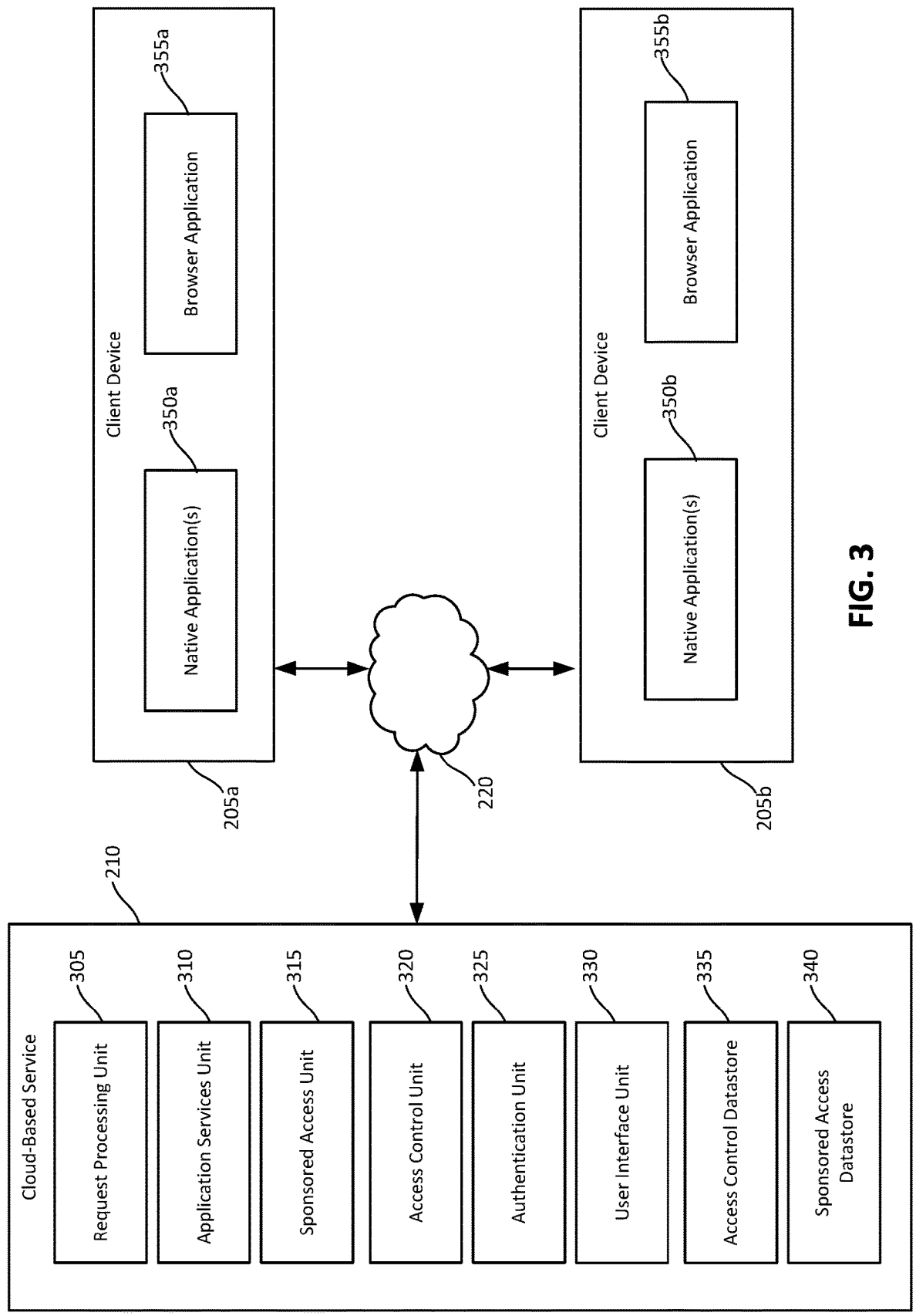
FIG. 3 is a diagram showing an example cloud-based service in which the techniques herein may be implemented.

FIG. 3 is a diagram showing additional features of the cloud-based service 210, the client device 205a and the client device 205b. The cloud-based service 210 may include a request processing unit 305, an application services unit 310, a sponsored access unit 315, an access control unit 320, an authentication unit 325, a user interface unit 330, an access control datastore 335, and a sponsored access datastore 340. The sponsored access datastore 340 can implement the sponsored access datastore 172 shown in FIGS. 1C and 1D.

The request processing unit 305 receives requests to access, modify, create, and/or otherwise consume an electronic document from a user of the client device 205a or 205b. The electronic document may be presented to the user in a web browser, such as the browser application 355a or 355b, or in a web-enabled native application, such as the native application 350a or 350b, which provides functionality for a user to access, modify, create, and/or otherwise consume multiple electronic documents and/or other content in a tabbed user interface. The request processing unit 305 provides the request received from client device 205a or 205b to the application services unit 310. The application services unit 310 provides functionality for users to consume, create, share, collaborate on, and/or modify various types of electronic content. The electronic content may include host electronic documents that include one or more sponsored electronic content items. In some implementations, the application services unit 310 utilizes the user interface unit 330 to provide a web-based interface to enable users to access at least a portion of the services provided by the cloud-based service 210. In other implementations, users access the services provided by the cloud-based service 210 via one or more native applications 350a and 350b.

The sponsored access unit 315 generates and stores sponsor information in the sponsored access datastore 340. As discussed in the preceding examples, a host electronic document may include one or more sponsored content items. The contents of the sponsored content items are not inserted into the host electronic document directly. Instead, the sponsored access unit 315 detects a paste command or insert command has been issued by a user of the application provided by the application services unit 310. The sponsored electronic content item is rendered when the host electronic document is accessed by a user to view and/or modify the host electronic content item. The sponsored access unit 315 stores sponsor information in the sponsored access datastore 340. The sponsor information includes information identifying the host electronic document and the sponsored content items that have been sponsored in the host electronic document. The link information includes a filename or other identifier of the host electronic document and the sponsored content items. The link information also includes locations where the host electronic document and sponsored content items are stored. As discussed in the preceding examples, the host electronic document and the sponsored content items may be stored in the same or different content sources associated with the cloud-based service 210. Each content source may be a separate persistent datastore associated with a cloud-based service 210. Each content source may be associated with different entities and may have a different set of access permissions associated with the content stored therein that limits who may access the content and which actions may be taken with the content.

In some implementations, the sponsored access unit 315 sends an indication to the access control unit 320 to update the access control list or other access control means associated with the sponsored content items to permit access to the sponsored content items based on the sponsorship claim. The access control unit 320 updates the access control list or other access control means automatically in some implementations. In other implementations, the access control unit 320 prompts the user adding the sponsored content item to the host electronic document to confirm whether the user authorizes the access control list or other access control means for the sponsored content item to be updated. The user may be presented with a popup dialog on a user interface of the client device 205 of the user in response to the user adding a sponsored content item to the host electronic document.

The sponsored access unit 315 generates and sends sponsor tokens to the client device 205 of a user requesting access to the host electronic document. As discussed in the preceding example, the cloud-based service 210 receives a request for the host electronic document. The request processing unit 305 provides the request to the sponsored access unit 315 to determine whether the requested document is a host electronic document. The sponsored access unit 315 looks up the requested document in the sponsored access datastore 340 and obtains the sponsor information for the host electronic document. The sponsored access unit 315 generates a sponsor token from the sponsor information. In some implementations, the sponsor token includes a single claim that indicates that the bearer of the token is permitted to access the sponsored content items associated with the host electronic document. The sponsored access unit 315 also signs the token using a private key associated with the cloud-based service 210, in some implementations. Signing the token verifies that it has been generated by the cloud-based service 210. Signing the token also verifies the integrity of the token, indicating that the claim contained therein has not been altered. Furthermore, the sponsored access unit 315 encrypts contents of the token in some implementations to ensure that the contents cannot be read or intercepted by a third party.

The sponsored access unit 315 analyzes the host sponsor token received with a request for sponsored content items from a client device 205 to determine whether the host sponsor token received with the request for the sponsored content items is valid. If the sponsor token is valid, the sponsored access unit 315 provides an indication to the application services unit 310 that the sponsored access token is valid. The sponsored access unit 315 provides an indication to the application services unit 310 that the users requesting access to the sponsored content items presented a valid sponsor token. The application services unit 310 then utilizes the access control unit 320 to determine whether any access controls associated with the host electronic document, or a sponsored content item, would preclude the user from accessing the host electronic document or the sponsored content items, even though the host sponsor token was valid.

The access control unit 320 determines whether a user who has requested a host electronic document or a sponsored content item is permitted to access the requested item or items. As discussed in the preceding examples, the access control list or other controls associated with a sponsored item are updated to permit access to the sponsored content item based on a sponsorship claim which is presented in the sponsorship token when access to the sponsored content item is requested. However, the access provided by the sponsorship claim does not override the other access controls associated with the sponsored content item. The access control unit 320 determines whether the user is permitted to access these requested item or items based on the access control list or other access control means associated with the items. The host electronic document and the sponsored content items may be associated with different access controls that preclude a user from accessing the host electronic document or the electronic content items. The access control unit 320 provides an indication to the application services unit 310 whether the user is permitted to access the host electronic document and the sponsored content items. If the user is permitted to access the host electronic content and the sponsored content items, the application services unit 310 accesses these items from the appropriate content source and causes the host electronic document and the sponsored content items to be presented to the user on the client device 205 of the user. If the user does not have access to the host electronic document, the application services unit 310 presents an error message to the user indicating that the user does not have access to the host electronic document. If the user has access to the host electronic document but does not have access to one or more of the sponsored content items, the application services unit 310 causes the host electronic document to be presented to the user on the client device 205 of the user. The application services unit 310 causes a placeholder to be rendered in the host electronic document for any sponsored content items that could not be accessed. A technical benefit of this approach is that the user is aware of the existence of the sponsored content item that is unavailable and may contact an administrator to adjust the access control settings of that sponsored content item, if possible.

The authentication unit 325 provides functionality for verifying whether users are permitted to access the services and/or documents provided by the cloud-based service 210 and/or the cloud-based service 210. The authentication unit 325 may provide functionality for receiving authentication credentials for the users from their respective client device 205. The authentication unit 325 may be configured to verify that the authentication credentials are valid and permit the users to access the services and/or documents provided by the cloud-based service 210 responsive to the authentication credentials being valid.

The client device 205a includes one or more native applications 350a and/or a browser application 355a. The client device 205b includes one or more native applications 350b and/or a browser application 355b. The one or more native applications 350a or 350b may include an application developed for use on the client device 205a or 205b and/or an application that may communicate with the cloud-based service 210 to enable users to consume, create, share, collaborate on, and/or modify electronic content including host electronic documents. The browser applications 355a and 355b are an application for accessing and viewing web-based content. In some implementation, the cloud-based service 210 provides a web application that enables users to consume, create, share, collaborate on, and/or modify content in some implementations. A user of the client device 205a or 205b accesses the web application, and the browser application 355a or 355b renders a user interface for interacting with the cloud-based service 210. The cloud-based service 210 may support both the web-enabled native applications 350a and 350b and web-application user interface provided by the user interface unit 330, and the users may choose which approach best suits their needs. The cloud-based service 210 may also provide support for the one or more native applications 350a and 350b, the browser applications 355a or 355b, or both to provide functionality for a user of the client device 205 to obtain the services provided by the cloud-based service 210.

Figure 4:
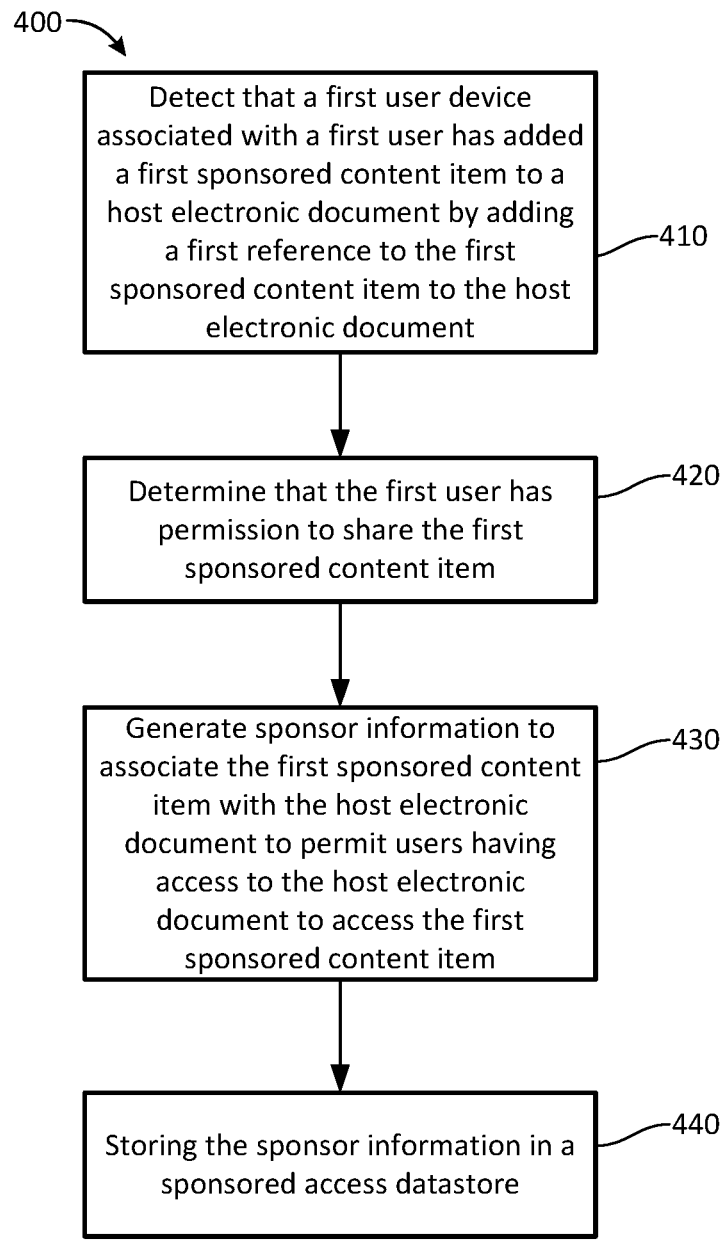
FIG. 4 is a flow diagram of an example process for sponsoring access to sponsored electronic content items of a host electronic document.

FIG. 4 is an example flow diagram of a process 400 for sponsoring access to sponsored content in a host electronic document according to the techniques herein. The process 400 may be implemented by the sponsored access unit 315 of the cloud-based service 210. The process 400 includes an operation 410 of detecting that a first user device associated with a first user has added a first sponsored content item to a host electronic document by adding a first reference to the first sponsored content item to the host electronic document. The first sponsored content item is stored separately in a memory of the cloud-based service 210 from the host electronic document. In some implementations, the sponsored access unit 315 monitors user activity in an application provided by the cloud-based service 210 to detect that the user has inserted a sponsored content item into the host electronic document. In some implementations, the sponsored access unit 315 detects a paste command or insert command has been issued by a user of the application provided by the application services unit 310.

The process 400 includes an operation 420 of determining that the first user has permission to share the first sponsored content item with other users of the cloud-based service. The sponsored access unit 315 can request an indication from the access control unit 320 to obtain an indication that the first user is permitted to share the sponsored content item. If the first user is permitted to share the sponsored content item, the sponsored access unit 315 updates the sponsored access datastore 340 with information linking the host electronic document with the sponsored content item. The sponsor information is updated in response to a sponsored content item being added or removed from the host electronic document. In some implementations, the access control list or other access control means associated with the sponsored content item can be updated to add or remove access based on the sponsorship claim associated with the host electronic document in response to the addition or removal of the sponsored content item. In some implementations, the sponsored access unit 315 is also configured to periodically check the sponsor information stored in the sponsored access datastore 340. The sponsored access unit 315 requests a determination of whether one or more users designated as owners of the host electronic document still have access to the host electronic document. If at least one of the owners of the document no longer have access to the host electronic document, the sponsored access is revoked for the host electronic document by deleting the sponsor information for the host electronic document from the sponsored access datastore 340. Removal of this information will prevent other users from obtaining a sponsored access token for the host electronic document. Furthermore, any sponsorship claims that have been added to the access control list or other access control means associated with the sponsored content items can also be removed.

The process 400 includes an operation 430 of generating sponsor information to associate the sponsored content item with the host electronic document to permit users having access to the host electronic document to access the sponsored content item and an operation 440 of storing the sponsor information in a sponsored access datastore. The sponsored access unit 315 stores the sponsor information in the sponsored access datastore 340. The sponsor information associates the host electronic document 105 with the sponsored content items so that the cloud-based service can generate a sponsor token for users who are authorized to access the host electronic document 105.

Figure 5:
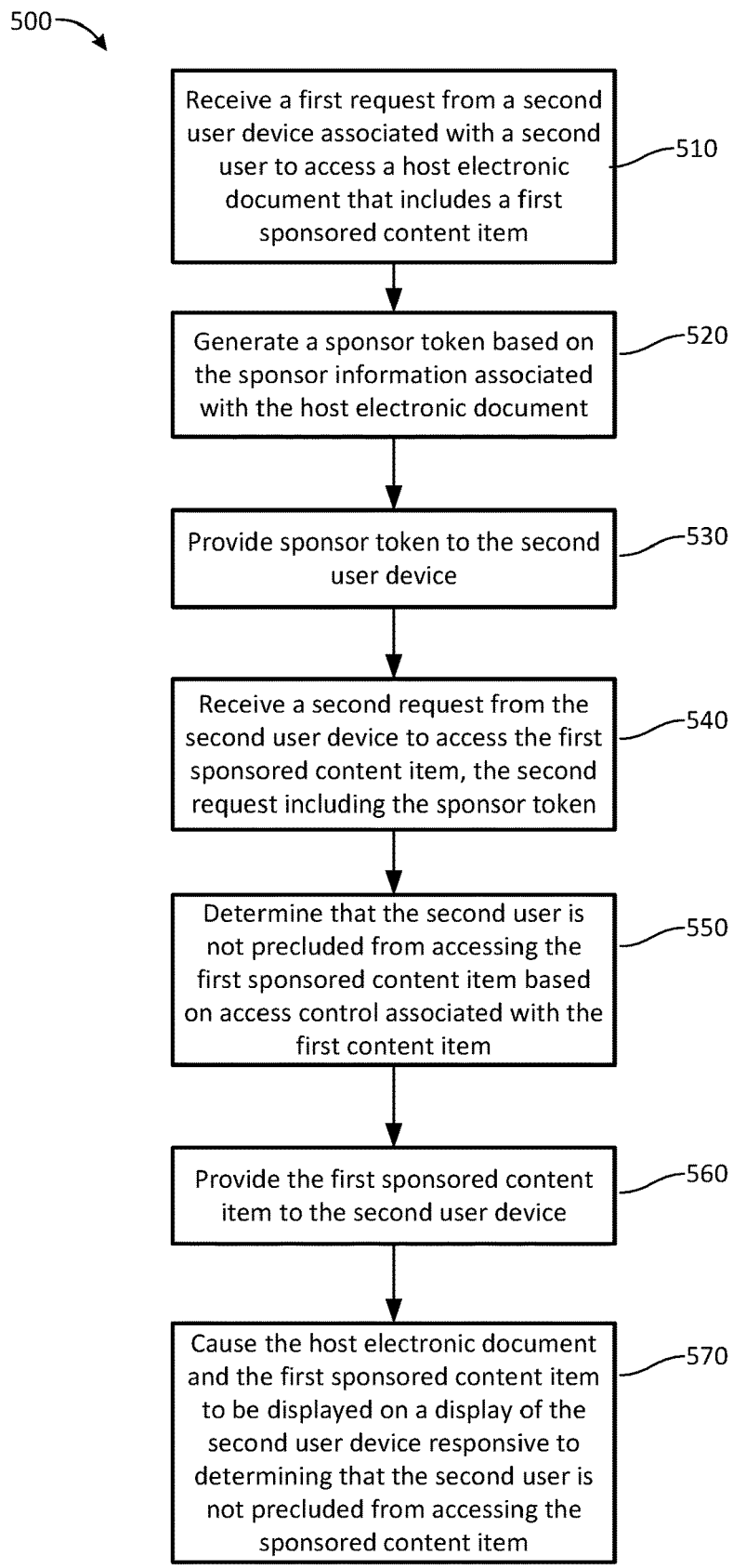
FIG. 5 is a flow diagram of an example process for determining whether a user has access to a host electronic document and electronic content items sponsored in the host electronic document.

FIG. 5 is an example flow diagram of a process 500 for requesting access to a host electronic content and sponsored content items using a sponsor token. The process 500 may be implemented by the sponsored access unit 315 of the cloud-based service 210. The process 500 may be implemented following the process 400 to process requests from a second user to obtain access to the host electronic document and the first electronic content item sponsored therein.

The process 500 includes an operation 510 of receiving a first request from a second user device associated with a second user to access the host electronic document that includes the first sponsored content item. As discussed in the preceding examples, the first user may attempt to access the host electronic document from the user device 205. The client device 205 may send an indication to the cloud-based service 210 that indicates that the user has requested the host electronic document. In implementations in which the first user has attempted to access the host electronic document from a native application on the client device, the cloud-based service 210 may send a copy of the host electronic document to the client device 205. In other implementations, where the first user has attempted to access the host electronic document from a browser application, the cloud-based service 210 generates a representation of the host electronic document that is displayed in the browser application of the client device 205.

The process 500 includes an operation 520 of generating a sponsor token based on the sponsor information associated with the host electronic document and an operation 530 of providing the sponsor token to the second user device. The sponsored access unit 315 obtains the sponsor information from the sponsored access datastore 340 and generates the sponsor token based on the sponsor information. The sponsored access unit 315 sends the sponsor token to the user device 205 of the second user.

The process 500 includes an operation 540 of receiving a second request from the second user device to access the first sponsored content item and the sponsor token associated with the host electronic document. The second request includes the sponsor token. As discussed in the preceding examples, the user device 205 of the second user can request the sponsored content items from the cloud-based service 210 once the host electronic document and the sponsor token are received.

The process 500 includes an operation 550 of determining that the second user is not precluded from accessing the first sponsored content item based on access controls associated with the sponsored content item and an operation 560 of providing the first sponsored content to the second user device. The user may be unable to access the sponsored content item due to access restrictions placed on the sponsored content item as discussed in the preceding examples. The access provided by the sponsor token is additive with any accession controls that are in place on the sponsored content item. The sponsor token can provide the user with access to sponsored content items of the host electronic content if the user was not expressly granted such access based on the access controls on the sponsored content items. However, the sponsor token cannot override any access controls that expressly preclude the user from accessing the sponsored content items. For example, access controls on the sponsored content items may impose restrictions which may include but are not limited to data privacy and protection restrictions, geographical restrictions, restrictions on which user or groups of users within an organization may access certain content, restrictions on performing certain actions on content, such as cutting and pasting or printing the content, or restrictions on sharing the content via email, messaging, or via other means. The sponsored token cannot override such restrictions. A technical benefit of this approach is that it ensures that the sponsor token cannot be used to override express restrictions on which users may access the sponsored content items and how they may access the sponsored content items.

The process 500 includes an operation 570 of causing the host electronic document and the sponsored content item to be displayed on a display of the first user device responsive to determining that the user is not precluded from accessing the sponsored content item. The host electronic document and the sponsored content items are rendered on the display of the client device 205 of the first user if the first user is permitted to access both the host electronic content and the sponsored content items. If the user is not permitted to access a sponsored content item, the host electronic document is rendered with a placeholder indicating that the sponsored content item could not be accessed.

Figure 6A:
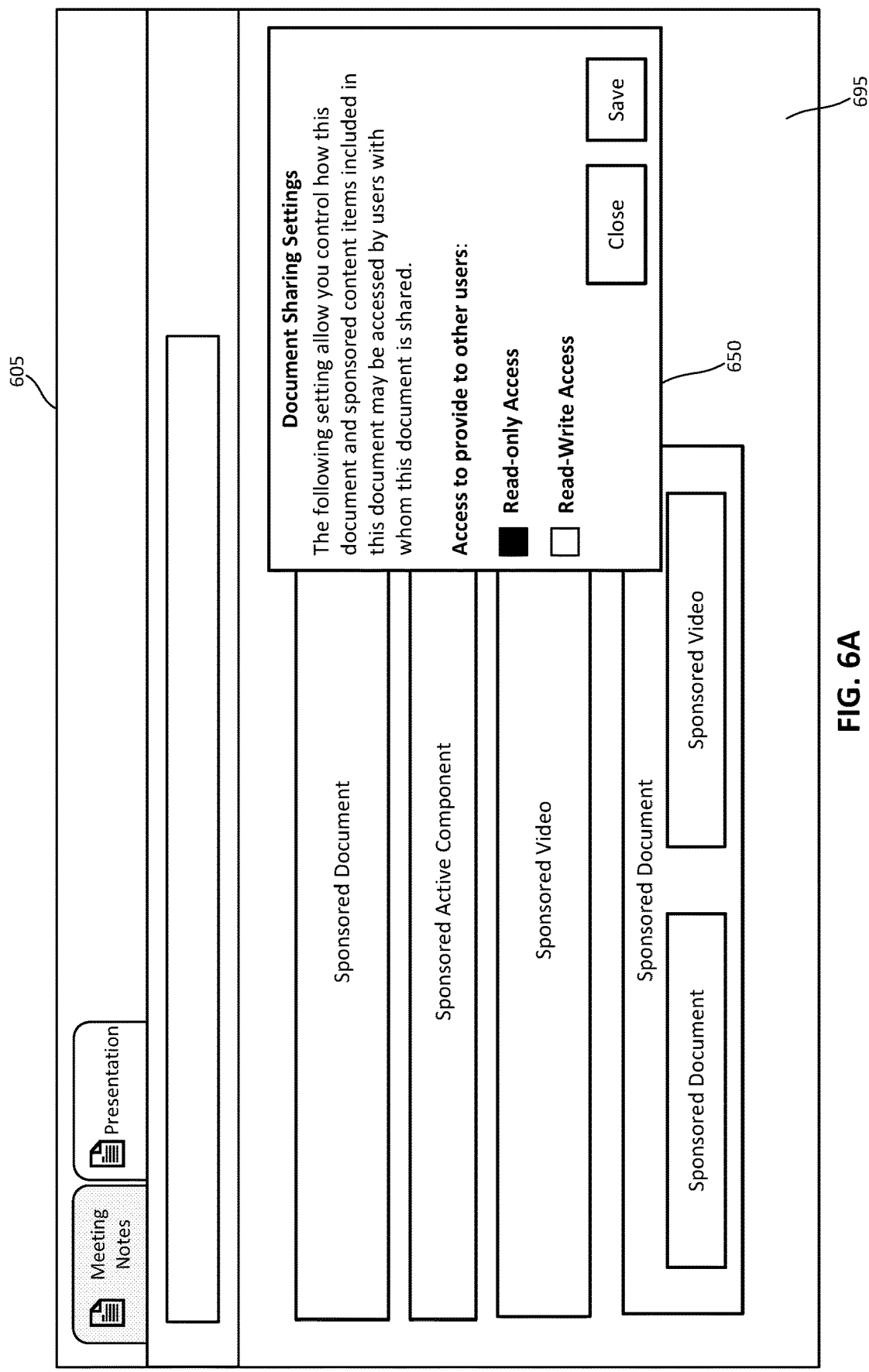
FIG. 6A is a diagram of an example user interface for document sharing settings generated by the user interface unit of the cloud-based service shown in FIG. 1.
Figure 6B:
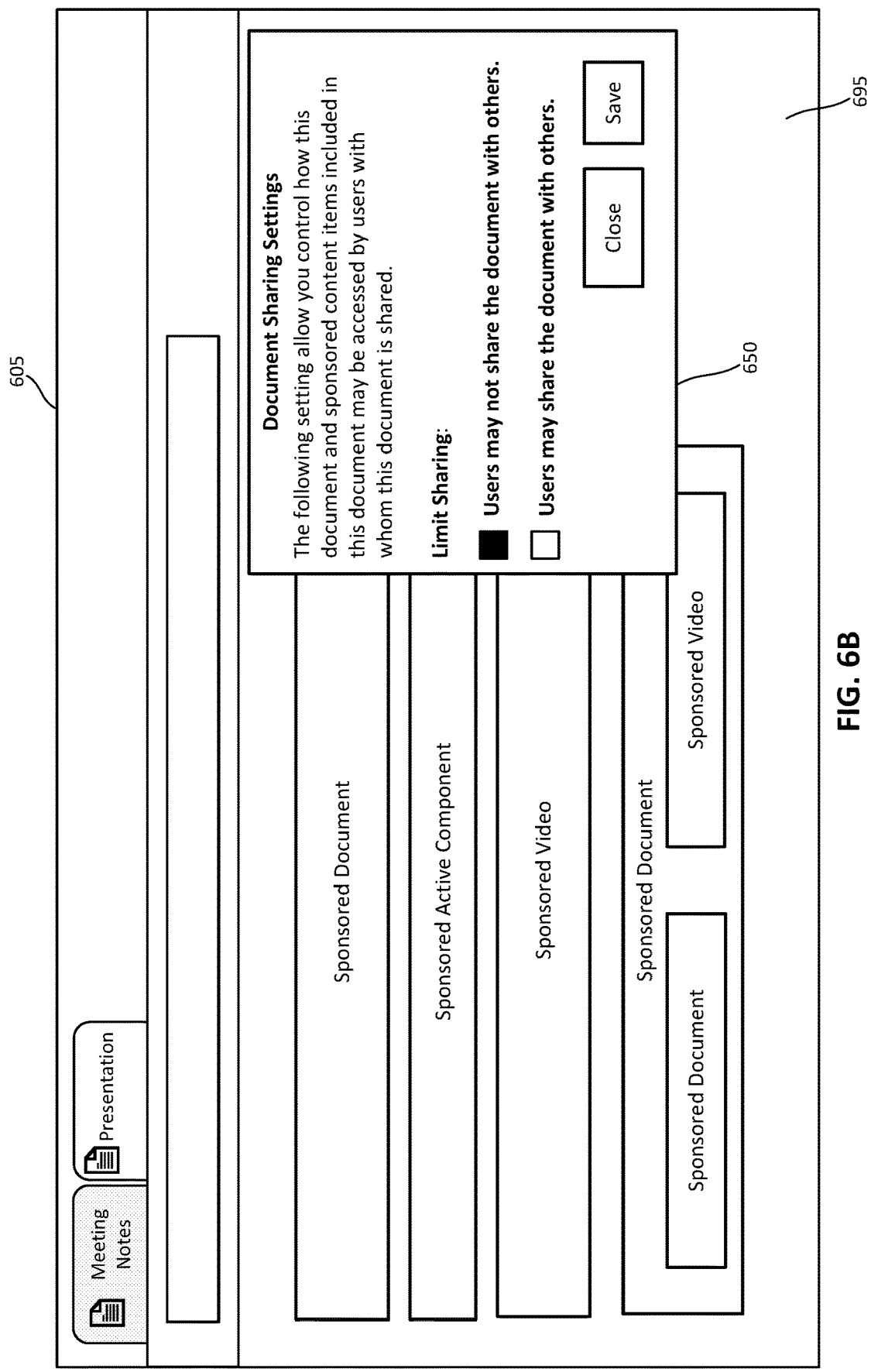
FIG. 6B is a diagram of another example d user interface for document sharing settings generated by the user interface unit of the cloud-based service shown in FIG. 1.
Figure 6C:
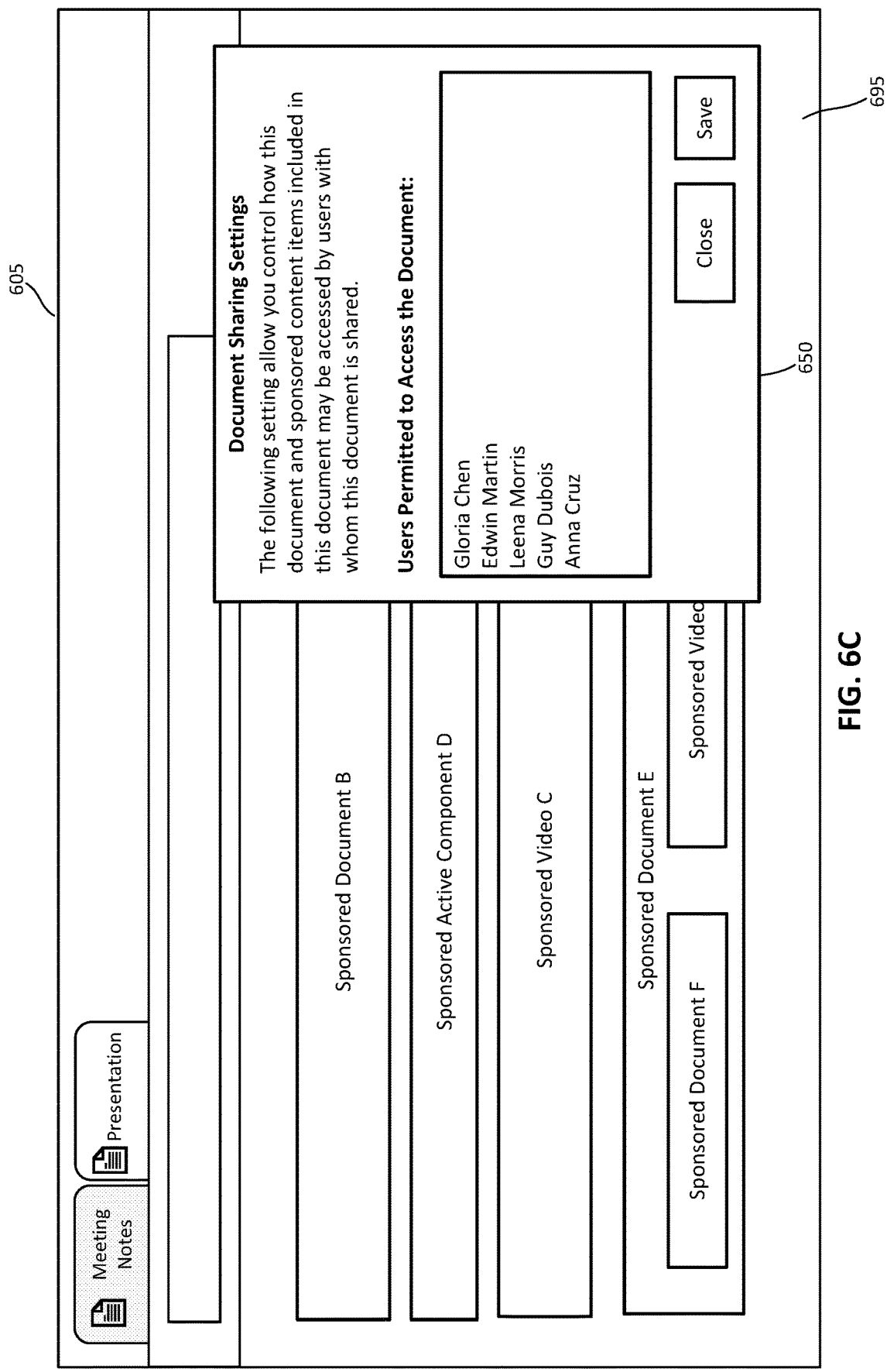
FIG. 6C is a diagram of another example user interface for document sharing settings generated by the user interface unit of the cloud-based service shown in FIG. 1.

FIGS. 6A-6C show example implementations of a document sharing a settings user interface 650 that allows a user to configure parameters of the sponsor token for a host electronic document, such as the document 105 shown in FIGS. 1A and 1B. The examples shown in FIGS. 6A-6C show an example of a web-based word processing application shown in a web browser, such as the browser applications 355a and 355b shown in FIG. 3. The contents of the host electronic document are shown in a content pane 695 of the web browser. While the example implementations of the document sharing user interface 650 shown in FIGS. 6A-6C are shown in a web-based word processing application, the document sharing user interface may be utilized by other types of applications that may be used to create host electronic documents. Furthermore, the other implementations of the document sharing user interface 650 may be implemented by a native application, such as the native applications 350a and 350b shown in FIG. 3.

In the example implementation shown in FIG. 6A, the user interface for document sharing settings 650 provides options for controlling the level of access that users who are provided the sponsor token for the host electronic document. In this example, the user may be granted read-only access or read-write access to the host electronic document. In some implementations, the access level granted is applied to the sponsored electronic content items. In other implementations, the access level granted to the sponsored items varies depending upon the type of content item. For example, while the sponsor token may grant read-write access to a user in possession of the sponsor token, but the user may only be granted read access to the sponsored video. The specific access granted to various types of sponsored content items may vary from implementation to implementation.

In the example implementation shown in FIG. 6B, the user interface for document sharing settings 650 includes an option in which the user in possession of the token is precluded from sharing the document with other users. In some implementations, the sponsor token include information indicating a user or group of users who are authorized to access the host document and the sponsored content items sponsored therein. Authorized users would not be able to share the sponsor token with other users who are not specified in the sponsor token. This approach may be used to ensure that host electronic documents and/or the sponsored content items included therein which include sensitive information are not intentionally or accidentally shared with users who should not have access to these items. Such access may also be controlled through access control lists and other similar means for access control but placing such limitations in the sponsor token provides a more efficient process for managing such access. The underlying access control policies associated with the host electronic document and/or the sponsored content items would otherwise need to be individually updated. Such updates would be labor intensive and prone to errors that inadvertently allow access to users who shouldn't have access to a content item or disallow access to users who should have access to a content item.

In the example implementation shown in FIG. 6C, the user interface for document sharing settings 650 enables a user to create a list of users who are authorized to access the sponsored content using the sponsored token. Such implementations would prevent other user who are not authorized to access the host electronic document and the sponsored items even if they obtain a copy of the sponsor token. The implementation shown in FIG. 6C may be used in combination with the implementation shown in FIG. 6B to identify the users who are permitted to have access to the host electronic document and the sponsored content items sponsored therein where the user has selected the option that indicates that users may not share the host electronic document with other users.

In some implementations of the user interface for document sharing settings 650, the user interface for document sharing settings 650 include all the settings controls shown in FIGS. 6A-6C. Other implementations include a subset of these setting controls from FIGS. 6A-6C. Other implementations may include additional controls for managing who may access the host electronic document and the sponsored content items included therein. Some implementations include controls for providing an expiration date and/or time that indicates when the sponsored token will expire. Once the sponsored token expires, any users relying on the sponsored to access the host electronic document and/or the sponsored content items included therein would lose access to the host electronic document and/or the sponsored content items unless the users are otherwise permitted to access these items through based on the access control list or other access control policy settings. In some implementations, the user interface for document sharing settings 650 provides controls for defining geographic restrictions for the sponsored token. In a non-limiting example, the user may define geographic restrictions that permit the user to indicate that the sponsored token may only be used within certain a specified geographic area or areas and/or the sponsored token is precluded from being used by users located in a specified geographic area or areas. To illustrate this concept, the user may implement a geographic restriction that limits the usage of the sponsored token within France due to local data privacy and protection laws.

The detailed examples of systems, devices, and techniques described in connection with FIGS. 1-6C are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6C are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
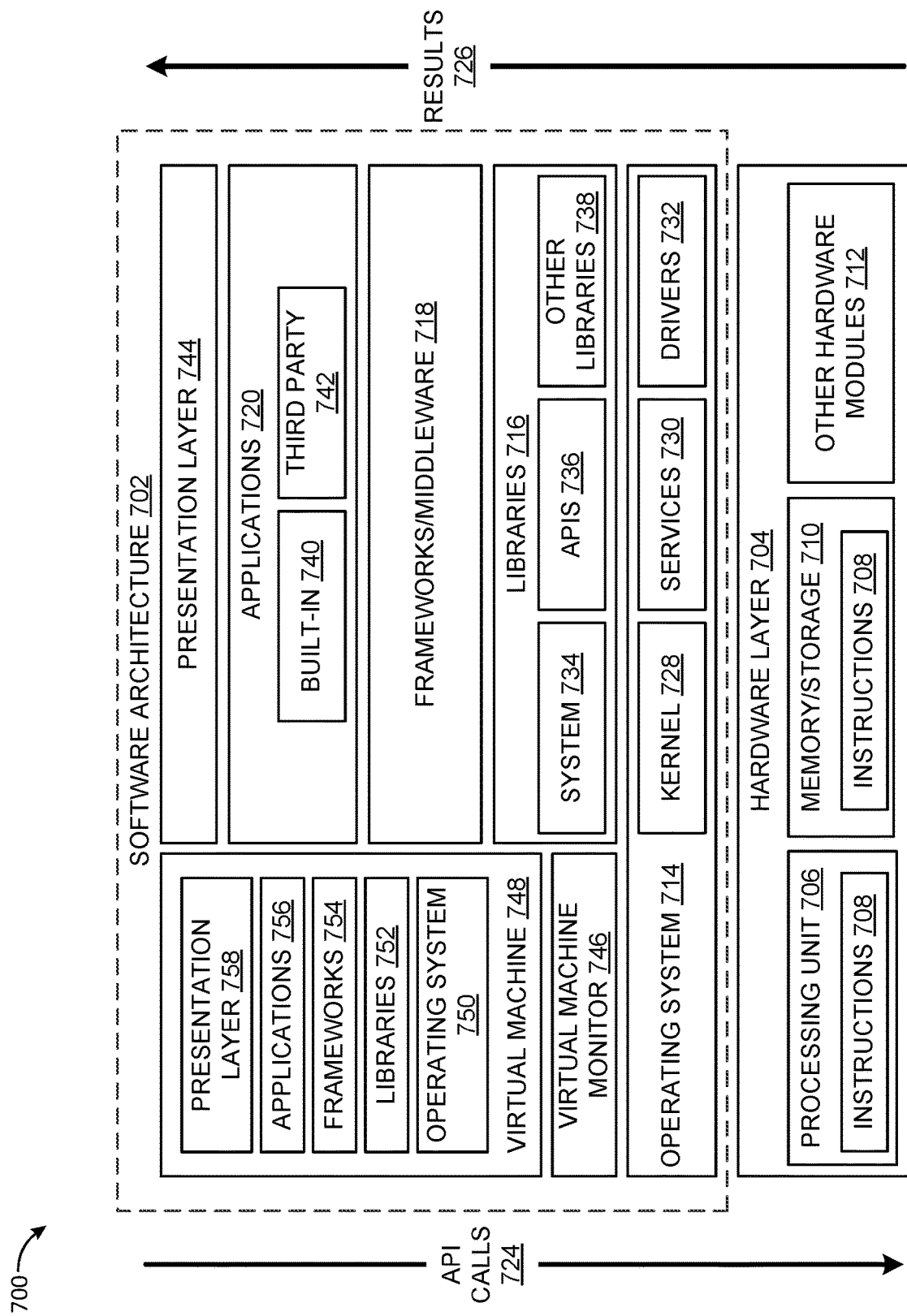
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
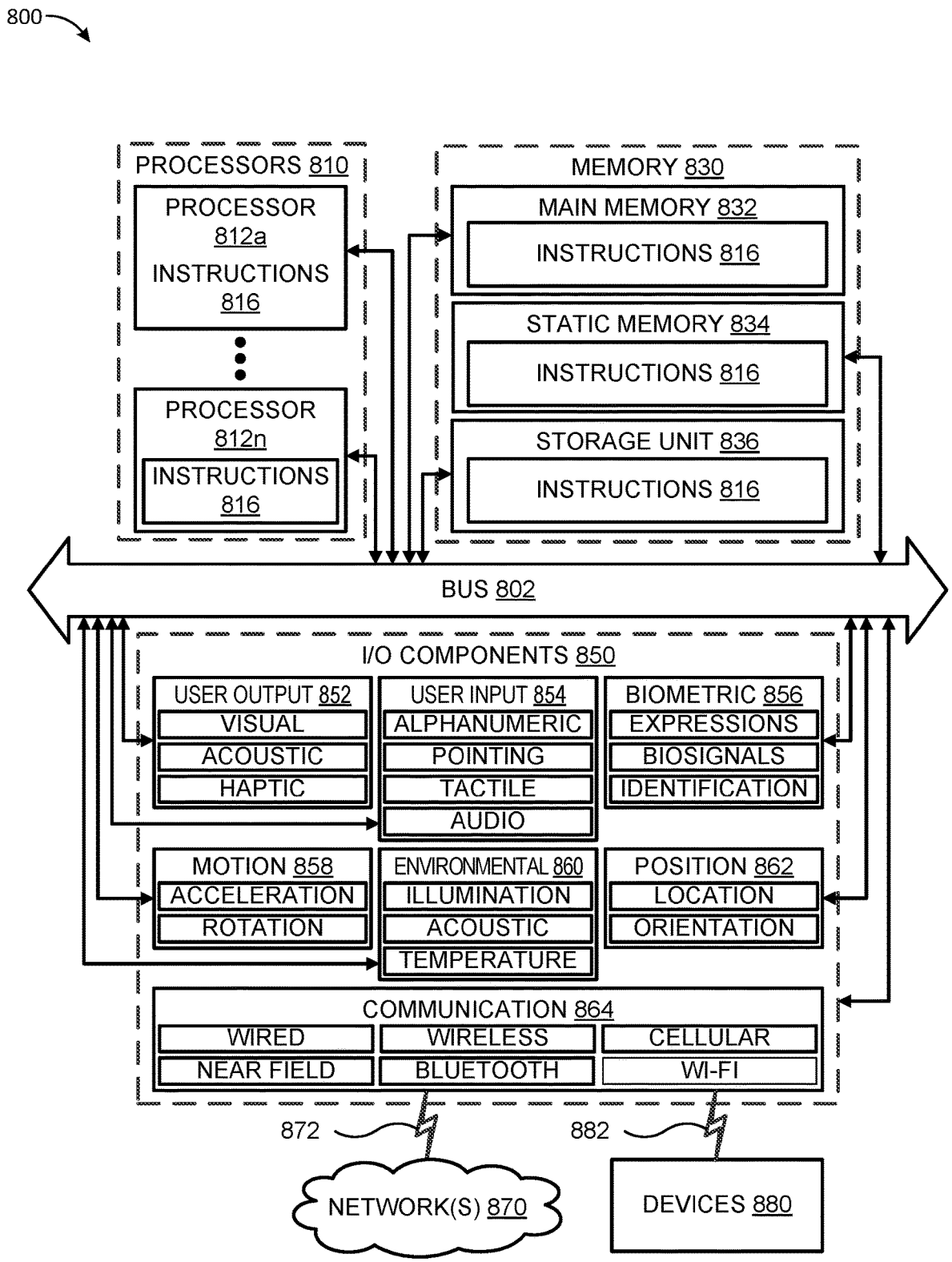
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors $812a$ to $812n$ that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

The drawing figures depict one or more implementations in accord with the present teachings, by way of example only, not by way of limitation. In the figures, like reference numerals refer to the same or similar elements. Furthermore, it should be understood that the drawings are not necessarily to scale. Furthermore, while various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
  a processor; and
  a machine-readable medium storing executable instructions that, when executed, cause the processor to perform operations comprising:
    detecting that a first user device associated with a first user has added a first sponsored content item to a host electronic document by adding a first reference to the first sponsored content item to the host electronic document, the first sponsored content item being stored separately from the host electronic document in a memory of a cloud-based service;
    determining that that the first sponsored content item includes a second reference to a second sponsored content item, the second sponsored content item being stored separately from the host electronic document and the first sponsored content item, the first sponsored content item and the second sponsored content item being arranged hierarchically as layers of sponsored content;
    determining that the first user has permission to share the first sponsored content item and the second sponsored content item with other users of the cloud-based service;
    responsive to determining that the first user has permission to share the first sponsored content item and the second sponsored content item, generating sponsor information to associate the first sponsored content item and the second sponsored content item with the host electronic document to permit users having access to the host electronic document to access the first sponsored content item and the second sponsored content item;
    storing the sponsor information in a sponsored access datastore;
    receiving a first request from a second user device associated with a second user to access the host electronic document;
    generating a first sponsor token based on the sponsor information associated with the host electronic document, the first sponsor token recursively applying to the layers of sponsored content associated with the host electronic document to enable the second user device to access the first sponsored content item and the second sponsored content item; and
    providing the first sponsor token to the second user device.

2. The data processing system of claim 1, wherein the first sponsor token includes a claim that the second user has access to the host electronic document, and wherein generating the first sponsor token includes operations of:
  signing the first sponsor token with a digital signature key associated with the cloud-based service.

3. The data processing system of claim 1, wherein generating the first sponsor token includes operations of:
  encrypting contents of the first sponsor token using an encryption key associated with the cloud-based service.

4. The data processing system of claim 1, wherein the machine-readable medium includes instructions configured to cause the processor to perform operations of:
  receiving a second request from the second user device to access the first sponsored content item and the first sponsor token associated with the host electronic document;
  determining that the second user is not precluded from accessing the first sponsored content item based on access controls associated with the first sponsored content item; and
  providing the first sponsored content item to the second user device.

5. The data processing system of claim 4, wherein the machine-readable medium includes instructions configured to cause the processor to perform operations of:
  causing the second user device to display the host electronic document and the first sponsored content item on a display of the second user device.

6. The data processing system of claim 1, wherein the machine-readable medium includes instructions configured to cause the processor to perform operations of:
  detecting that the first user device associated with the first user has added a third reference to a third sponsored content item to the host electronic document by adding the third reference to the first sponsored content item to the host electronic document, the third sponsored content item being stored separately from the host electronic document in a memory of a cloud-based service;

determining that the first user has permission to share the third sponsored content item with other users of the cloud-based service; and updating the sponsor information to associate the third sponsored content item with the host electronic document to permit users having access to the host electronic document to access the second sponsored content item.

7. The data processing system of claim 1, wherein the machine-readable medium includes instructions configured to cause the processor to perform operations of:

receiving a third request from a third user device associated with a third user to access the host electronic document;

generating a second sponsor token based on the sponsor information associated with the host electronic document; and providing the second sponsor token to the third user device.

8. The data processing system of claim 7, wherein the machine-readable medium includes instructions configured to cause the processor to perform operations of:

receiving a fourth request from the third user device to access the host electronic document and the second sponsor token associated with the host electronic document;

determining that the third user is not precluded from accessing the host electronic document;

determining that the third user is not precluded from accessing the first sponsored content item based on access controls associated with the first sponsored content item;

determining that the third user is precluded from accessing the second sponsored content item based on access controls associated with the second sponsored content item;

providing the host electronic document to the third user device;

providing the first sponsored content item to the third user device; and providing an indication that the third user cannot access the second sponsored content item to the third user device.

9. The data processing system of claim 8, wherein the machine-readable medium includes instructions configured to cause the processor to perform operations of:

causing the third user device to display the host electronic document, the first sponsored content item, and a placeholder representation of the second sponsored content item on a display of the third user device.

10. A method implemented in a data processing system for sponsoring access to sponsored electronic content, the method comprising:

detecting that a first user device associated with a first user has added a first sponsored content item to a host electronic document by adding a first reference to the first sponsored content item to the host electronic document, the first sponsored content item being stored separately from the host electronic document in a memory of a cloud-based service;

determining that that the first sponsored content item includes a second reference to a second sponsored content item, the second sponsored content item being stored separately from the host electronic document and the first sponsored content item, the first sponsored content item and the second sponsored content item being arranged hierarchically as layers of sponsored content;

determining that the first user has permission to share the first sponsored content item and the second sponsored content item with other users of the cloud-based service;

responsive to determining that the first user has permission to share the first sponsored content item and the second sponsored content item, generating sponsor information to associate the first sponsored content item and the second sponsored content item with the host electronic document to permit users having access to the host electronic document to access the first sponsored content item and the second sponsored content item;

storing the sponsor information in a sponsored access datastore;

receiving a first request from a second user device associated with a second user to access the host electronic document;

generating a first sponsor token based on the sponsor information associated with the host electronic document, the first sponsor token recursively applying to the layers of sponsored content associated with the host electronic document to enable the second user device to access the first sponsored content item and the second sponsored content item; and providing the first sponsor token to the second user device.

11. The method of claim 10, wherein the first sponsor token includes a claim that the second user has access to the host electronic document, and wherein generating the first sponsor token further comprises:

signing the first sponsor token with a digital signature key associated with the cloud-based service.

12. The method of claim 10, further comprising:

receiving a second request from the second user device to access the first sponsored content item and the first sponsor token associated with the host electronic document;

determining that the second user is not precluded from accessing the first sponsored content item based on access controls associated with the first sponsored content item; and providing the first sponsored content item to the second user device.

13. The method of claim 12, further comprising:

causing the second user device to display the host electronic document and the first sponsored content item on a display of the second user device.

14. A non-transitory computer-readable medium on which are stored instructions that, when executed, cause a processor of a programmable device to perform operations of:

detecting that a first user device associated with a first user has added a first sponsored content item to a host electronic document by adding a first reference to the first sponsored content item to the host electronic document, the first sponsored content item being stored separately from the host electronic document in a memory of a cloud-based service;

determining that that the first sponsored content item includes a second reference to a second sponsored content item, the second sponsored content item being stored separately from the host electronic document and the first sponsored content item, the first sponsored content item and the second sponsored content item being arranged hierarchically as layers of sponsored content;

determining that the first user has permission to share the first sponsored content item and the second sponsored content item with other users of the cloud-based service;

responsive to determining that the first user has permission to share the first sponsored content item and the second sponsored content item, generating sponsor information to associate the first sponsored content item and the second sponsored content item with the host electronic document to permit users having access to the host electronic document to access the first sponsored content item and the second sponsored content item;

storing the sponsor information in a sponsored access datastore;

receiving a first request from a second user device associated with a second user to access the host electronic document;

generating a first sponsor token based on the sponsor information associated with the host electronic document, the first sponsor token recursively applying to the layers of sponsored content associated with the host electronic document to enable the second user device to access the first sponsored content item and the second sponsored content item; and providing the first sponsor token to the second user device.

15. The non-transitory computer-readable medium of claim 14, wherein the first sponsor token includes a claim that the second user has access to the host electronic document, the non-transitory computer-readable medium further comprising instructions configured to cause the processor to perform operations of:

signing the first sponsor token with a digital signature key associated with the cloud-based service.

16. The non-transitory computer-readable medium of claim 14, further comprising instructions configured to cause the processor to perform operations of:

receiving a second request from the second user device to access the host electronic document and the first sponsor token associated with the host electronic document;

determining that the second user is not precluded from accessing the first sponsored content item based on access controls associated with the first sponsored content item;

determining that the second user is precluded from accessing the second sponsored content item based on access controls associated with the second sponsored content item;

providing the host electronic document and the first sponsored content item to the second user device; and providing an indication that the second user cannot access the second sponsored content item to the second user device.

17. The non-transitory computer-readable medium of claim 16, further comprising instructions configured to cause the processor to perform operations of:

causing the second user device to display the host electronic document, the first sponsored content item, and the second sponsored content item on a display of the second user device.

* * * * *